United States Patent [19]
Colin et al.

[11] Patent Number: 4,940,631
[45] Date of Patent: Jul. 10, 1990

[54] CELLULAR CELLULOSIC WIPING MATERIAL

[75] Inventors: Claudine Colin, Rantigny; Jean-Luc Wertz, Beauvais, both of France

[73] Assignee: Societe Anonyme: Spontex, France

[21] Appl. No.: 225,227

[22] Filed: Jul. 28, 1988

[30] Foreign Application Priority Data

Mar. 30, 1988 [FR] France ............................... 88 04218

[51] Int. Cl.$^5$ ........................... B32B 3/26; B32B 7/04
[52] U.S. Cl. ................................. 428/309.9; 427/243; 427/244; 427/373; 427/379; 428/316.6; 428/473
[58] Field of Search .................. 428/309.9, 316.6, 473; 427/243, 244, 373, 379

[56] References Cited

U.S. PATENT DOCUMENTS

| | | | |
|---|---|---|---|
| 2,629,919 | 3/1953 | Golden | 428/473 |
| 2,996,409 | 8/1961 | Lavely | 428/316.6 |
| 3,341,640 | 9/1967 | Rosencrantz | 428/316.6 |
| 4,214,053 | 7/1980 | Porter | 521/70 |

Primary Examiner—William J. Van Balen
Attorney, Agent, or Firm—Brumbaugh, Graves, Donohue & Raymond

[57] ABSTRACT

The invention relates to a cellular cellulosic wiping material consisting of a cellular cellulosic substrate covered on at least one side with an expanded latex foam obtained from an aqueous latex composition having a viscosity of between 2500 and 3500 mPa.s, measured at 20° C. under 65% humidity, and giving a foam density of between 250 and 400 g/l.

16 Claims, No Drawings

CELLULAR CELLULOSIC WIPING MATERIAL

The present invention concerns the cleaning sector and relates to a cellular cellulosic wiping material.

Cellular cellulosic material, i.e cellulosic sponge, is a unique kind of material which, by virtue of its hydrophilicity and its cellular nature, very rapidly absorbs very large quantities of water, in general 15 to 20 times its dry weight. On the other hand, this water is very rapidly released simply by squeezing the said material by hand. Squeezing by hand makes it possible to reduce the water content of the cellulosic material to a minimum of one to two times its weight of water. Direct contact of the wet cellulose with the surface to be wiped effects mediocre wiping characterized by the presence of drops of water left on this surface (window panes, tiles, sanitary ware, etc.).

Dry cellulosic materials, such as disposable paper, make it possible to obtain a good wiping quality characterized by an absence of drops of water visible to the naked eye, provided the quantity of water absorbed does not exceed the weight of dry cellulose. If this quantity of water is exceeded, the paper has to be changed.

The cellular cellulosic materials employed as cleaning materials are therefore essentially used at the moment for their absorbent properties.

The other cleaning materials known for their wiping properties, such as dry cellulosic products, paper, rags, nonwovens etc., and artificial or natural so-called "shammy" leathers, conversely possess mediocre absorbent properties.

The cellular cellulosic wiping material according to the invention consists of a cellular cellulosic substrate covered on at least one side with an expanded latex foam and has both absorbent properties and wiping properties.

The present invention further relates to a process for the preparation of the said cellular cellulosic material, which comprises the following steps:

(1) formation of an aqueous latex composition having a viscosity of between 2500 and 3500 mPa.s;

(2) expansion of the said composition to give a foam having a density of between 250 and 400 g/l;

(3) coating of the cellulosic substrate with this foam; and (4) heat treatment in order to fix and crosslink the foam on the cellhlosic substrate.

The cellulosic substrate, which constitutes one of the components of the material according to the invention, can be any kind of cellular cellulosic material commonly used for the manufacture of sponges or sponge cloths, and especially products manufactured from wood pulp dissolved by the viscose process via the xanthate derivative, with the addition of blowing agents and with subsequent regeneration by means of heat or acid.

There may also be mentioned processes for dissolving the cellulose in solvents or the carbamate process with the addition of blowing agents and precipitation of the cellulose.

These processes, which are well known to those skilled in the art, produce cellular cellulosic materials whose density is generally between 10 and 150 g/l and whose porosity is generally between 10 and 5000 μm.

The cellular cellulosic materials used as cellulosic substrates according to the invention can contain a water retention agent such as, for example, magnesium chloride or a glycol.

The expanded aqueous latex composition consists of a latex, a foaming agent, a coagulant, a thickener and, if appropriate, auxiliary agents such as, in particular, vulcanizing agents, fillers, pigments, emulsifiers, coalescence agents and a catalyst.

The latex composition used to obtain the expanded foam comprises the following by weight, relative to the total weight of the composition:

at least 50% of a flexible latex possessing thermosensitive or crosslinking reactive groups;

0.05 to 0.15% of a foaming agent;

0 to 5% of a coagulant making it possible to convert the latex to film or coagulate it after expansion to form a foam; and 2 to 20% of a thickener.

The latex used is a flexible latex which must be resistant to water, fatty substances and abrasion and which possesses thermosensitive or self-crosslinking groups enabling the latex to be crosslinked at between 40° and 150° C. It must have a good chemical affinity for cellulose.

Lattices which are particularly suitable for the purposes of the invention are those of the butadiene/styrene type or nitrile type which possess, as repeat units, one of the units I or II below:

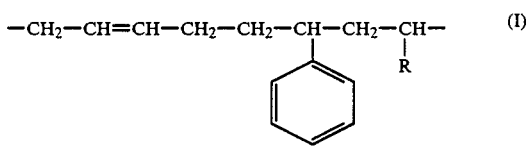

in which R is generally a carboxyl group;

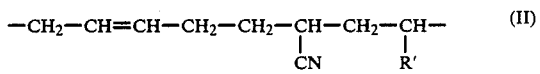

in which R' is a carboxyl group or the N-methylolacrylamide group:

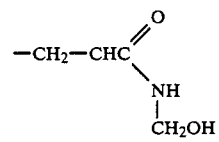

Nitrile lattices are preferred for the purposes of the invention because of their resistance to water and fats and because of their resistance to wear and ageing.

The viscosity of the aqueous composition, the amounts of foaming agent and coagulant and also the density of the foam are critical parameters.

The foaming agent used in the latex composition according to the invention is a surfactant which makes it possible to control the dispersion and the homogeneity of distribution of the air bubbles trapped in the aqueous latex composition during expansion by mechanical agitation. This foaming agent can be selected from sulfosuccinamates, alkali metal salts of fatty acids and alkylsulfonates. It is very particularly preferred to use sodium sulfosuccinamates, which lower the surface tension of the water contained in the aqueous latex composition and make it possible to form an elastic skin which solidifies the structure of the foam.

The latex composition according to the invention also contains a coagulant for lowering the Tg (glass transition temperature) of the latex or for destabilizing the latex by causing it to coagulate at a temperature of between 40° and 70° C.

The coagulant can be any type of coagulant commonly used in this field, for example functional polyorganosiloxanes.

The thickener used in the aqueous latex composition serves to increase the viscosity and stability of the aqueous composition and also the stability of the foam. This thickener can be, in particular, a dispersion of acrylic polymers. It plays an important part in the interpenetration of the porous structure of the foam in the cellulosic substrate.

The aqueous latex composition can also contain the following auxiliary ingredients:

pigments, the use of which makes it possible to visualize the total coating of the cellulosic substrate;

an emulsifier so that water-insoluble ingredients can be used, such as fillers like waxes and paraffins;

fillers, for example waxes and paraffins, for reducing the tackiness of the latex foam;

a vulcanizing agent, such as sulfur, which ensures the total or partial crosslinking of the latex; its presence is not necessary if the latex contains self-crosslinking reactive groups;

a coalescence agent from the family of the ethers or glycol esters; and a catalyst, such as ammonium chloride, for accelerating the coagulation of the latex.

The amount of the various auxiliary ingredients which can be used for the purposes of the invention is not critical and may easily be determined by those skilled in the art with the aid of routine tests.

However, two aqueous latex compositions suitable for the purposes of the invention will be indicated below by way of non-limiting Examples.

TABLE I

| AQUEOUS LATEX COMPOSITIONS | | |
|---|---|---|
| | Example | |
| Composition | I (%) | II (%) |
| Latex: SBR[(1)] (D.E.[(2)] 43%) | 85 | |
| Nitrile (D.E. 41%) | | 76 |
| Pigment | 0.4 | 2 |
| Foaming agent (D.E. 25%) | 0.1 | 0.08 |
| Anti-tack agent (D.E. 60%) | | 7.7 |
| Coagulant | 3.4 | 0.15 |
| Emulsifier (D.E. 30%) | 1.4 | 1.2 |
| Catalyst (D.E. 10%) | 0.4 | 0.7 |
| Thickener (D.E. 50%) | 9.3 | 12.17 |
| Viscosity[(3)] mPa.s | 3300 | 3100 |

[(1)] SBR: styrene/butadiene latex
[(2)] D.E.: dry extract
[(3)] viscosity measured with a VTO3 Haake viscometer with a no. 1 rotor in a conditioned atmosphere (20° C., 65% relative humidity)

The aqueous latex composition obtained is expanded by conventional processes well known to those skilled in the art. For example, this expansion is carried out in a continuous foam maker in which a density of between 250 and 400 g/l can be reached.

To obtain the cellular cellulosic wiping material according to the invention, it is important to have a stable foam starting from an aqueous latex composition whose viscosity is between 2500 and 3500 mPa.s, preferably between 3100 and 3300 mPa.s, with a pH of the order of 7.5 to 8.5. The expansion of the aqueous latex composition governs the stability of the foam and must produce a foam density of between 250 and 400 g/l, preferably of between 340 and 370 g/l.

It is important to choose the blowing equipment so as to give a pore size distribution in the foam of between 50 and 500 μm. The stability of the foam makes it possible to preserve this porosity during coating and crosslinking on the cellulosic substrate.

As regards the viscosity ($\eta$) and the density (d) of the foam, it has been found that a very stable, excessively expanded foam ($\eta$ greater than 3500 mPa.s, d=250 g/l) results in poor penetration of the foam on the cellulosic substrate and to delamination of the coating from the cellulose after crosslinking (weak mechanical adhesion). The excessively expanded foam has no cohesion and crumbles away.

Likewise, if the foam is very stable and inadequately expanded $\eta$=3500 mPa.s, d greater than 400 g/l), the penetration of the foam on the substrate is insufficient and the porosity of the foam is too low, which prevents water from passing through the coating layer into the absorbent substrate. The coating then forms a barrier to the water-absorbing function of the substrate. A low viscosity and a low degree of expansion ($\eta$ less than 2500 mPa.s, d=400 g/l) do not enable the expansion to be preserved during the coating and the crosslinking of the aqueous latex composition. The excessively low or inexistent porosity no longer allows water to pass into the cellulosic substrate. The mechanical adhesion, on the other hand, is facilitated by a high level of penetration into the cellulosic substrate.

A low viscosity and a high degree of expansion $\eta$ less than 2500 mPa.s, d≈250 g/l) do not produce a stable foam. The expansion collapses and a porous coating (in general of between 50 and 500 μm) can no longer be obtained.

The optimum stability for the foam and for preserving the porosity is obtained with a viscosity preferably of between 3100 and 3300 mPa.s and a foam density of between 340 and 370 g/l.

After expansion of the foam, the cellulosic substrate is coated therewith in accordance with wellknown procedures. t is possible to use, for example, a knife-over-roll coater, a two roll coater or a Storck coater on a rotary screen printing machine.

In this step of the process for the manufacture of the cellulosic material according to the invention, control of the parameters governing the adhesion and the covering of the substrate is a key point in terms of the quality of the finished product (mechanical strength—wiping quality). The adhesion is related to penetration of the coating into the sponge and to the wettability of the cellulose by the aqueous composition.

It is essential for the water content of the cellulosic substrate to be between 50% and 300% of water by weight, relative to the weight of cellulose, and preferably between 80% and 150%.

Below 50% of water in the sponge, the hygroscopic cellulose very rapidly dehydrates the expanded foam during coating, which causes the latex to form a film rapidly and the porosity to collapse.

Above 300% of water, the penetration of the foam is reduced by the water, which forms a barrier to the wetting of the cellulose by the latex. A high water content in the sponge results in a dilution of the expanded foam, which destabilizes it and causes the expansion to collapse. The preferred water content will be between 80% and 150%, in which range the penetration and adhesion are optimized without affecting the amounts deposited.

Furthermore, the cellulosic substrate can contain a surfactant, if appropriate, in order to improve the chemical affinity of the expanded aqueous composition and the cellulosic substrate. This surfactant can be selected, for example, from the family of the quaternary ammonium compounds.

Another purpose of this surfactant is to facilitate the swelling of the cellulose, thereby favoring the migration of the aqueous composition into the porous structure of the sponge and into the fibrillar structure of the cellulose.

The content of surfactant can vary between 0 and 3%. Above 3%, the surfactant has a reverse action and disfavors adhesion.

The pressure during coating must be between 0 and 750 N/m² in general; it must facilitate the penetration of the foam into the cellulosic substrate without crushing the latter. A pressure of between 0 and 200 N/m² will preferably be chosen.

The amount of foam deposited must make it possible to achieve good bonding to the cellulosic substrate and to keep the cellulose away from the surface to be wiped by totally covering the substrate. The dry weight deposited is advantageously between 40 and 250 g/m² and depends essentially on the porosity of the cellulosic sponge. For example, it may be indicated that the optimum deposit is between 80 and 100 g/m² for a sponge with a porosity of between 10 and 1000 μm, and the optimum deposit is between 100 and 180 g/m² for a sponge with a porosity of between 10 and 5000 μm.

Once the cellulosic substrate has been coated with the expanded foam, the product is subjected to a heat treatment which advantageously consists of a thermal flash, for example under infrared panels, to gel and solidify the foam, followed by a heat treatment in hot air to crosslink the latex.

The foam is gelled at between 40° C. and 80° C. according to the nature of the latex and the amount of coagulant. The treatment time is chosen to be between 20 and 60 seconds according to the water content of the aqueous composition and the amount deposited. This operation makes it possible to solidify the structure of the foam and to manipulate the coated product without risk of the porosity of the foam collapsing. If the infrared treatment is shorter than 20 seconds, the structure of the foam is insufficiently solidified and collapses during the heat treatment under hot air pressure. If it is longer than 60 seconds, the temperature on the surface of the foam crosslinks the latex at the immediate surface of this foam, closing the surface porosity. The hard and brittle crust created prevents water from evaporating out of the foam during the heat treatment. In the crosslinking step, the heat treatment must enable the temperature of the substrate to rise to 100° C. (in about 1 min) and then enable the latex to crosslink at above 120° C., preferably at between 120° C. and 130° C., for at least two minutes, preferably 2 to 10 minutes.

Once the product has been heat-treated, an antitack agent may be deposited on the surface to enable the product to be rolled up, if desired, by preventing the coating from sticking to itself or to the sponge. The conventional anti-tack agents can be used, in particular a dispersion of ammonium stearate.

Coating the cellulosic material with the latex foam, according to the invention, makes it possible to form a barrier to release of the absorbed water up to a weight of absorbed water which is 4 times the weight of the dry cellulosic material.

Beyond this and up to a weight absorbed which is 15 to 20 times the weight of the cellulosic material, the cellulosic substrate releases the water very rapidly.

During use, the cellulosic material according to the invention must be squeezed by hand, after the water has been absorbed, in order to reduce the water content to about one or two times the weight of the cellulose.

This operation therefore suffices to wipe a surface completely dry in a second step without needing to use a dry cellulosic product (paper or rag) or a shammy leather.

Whereas a conventional cellulosic sponge leaves drops of water of at least a few millimeters in diameter on the treated surface, the cellulosic material according to the invention makes it possible to obtain a perfectly clean surface.

Although the following theory is not intended to imply a limitation, it is thought that the layer of latex in the cellulosic material according to the invention carries the water by capillarity towards the cellulosic substrate, without inhibiting the function of the cellulosic material, and causes the water to be dispersed as fine droplets on the surface to be wiped. The water dispersed in this way then evaporates naturally under the effect of the vapor pressure, without leaving traces.

Coating both sides of a flat cellulosic sponge in no way detracts from the absorption capacity of the cellulosic substrate.

The invention will now be described in greater detail by means of the Examples below, in which the compositions shown in Table were used as the aqueous latex compositions.

EXAMPLE 1

Wiping Sponge Cloth

The chosen cellulosic substrate consisted of a flat product or cellulosic sponge cloth weighing 180 g/m², with a thickness of 3 mm, a mean porosity of 10 to 1000 μm and a water content of 100%.

This was coated with the expanded aqueous latex compositions described above, under the following conditions:

foam density: 340–370 g/l;
coating pressure: 0 to 200 N/m²;
deposit: 90 to 100 g/m²;
passage under infrared panels: 30 seconds at between 45° C. and 60° C.;
heat treatment in hot air: 1 minute at 100° C.;
heat treatment in hot air: 4 minutes at 130° C.

The performance characteristics of the product are reported in Table II together with those of the initial cellulosic substrate.

TABLE II

| WIPING SPONGE CLOTH Mean porosity: 10 to 1000 μm Format: 20 cm × 20 cm | | |
|---|---|---|
| | Initial cellulosic substrate | Wiping sponge cloth |
| Rupture stress (N) Standard EDANA 20-1-73 | l 20–27 w 11–17 | l 26–32 w 14–20 |
| Tear strength (N) Standard EDANA 70-1-75 Weight loss due to wear (mg) Hoboken abrasion tester | l 17–27 w 33–43 | l 18–28 w 34–44 |

TABLE II-continued

WIPING SPONGE CLOTH
Mean porosity: 10 to 1000 μm
Format: 20 cm × 20 cm

|  | Initial cellulosic substrate | Wiping sponge cloth |
|---|---|---|
| coated side | / | 4.5–6.5 |
| sponge side | 10–12 | 10–12 |
| Water absorption capacity (g) | 100–120 | 100–120 |
| Water absorption capacity (%) |  |  |
| Water absorption capacity (a) | 1400–1700 | 850–1000 |

(a) % relative to the weight of the dry product

The comparative water absorption performance characteristics of the wiping sponge cloth and natural shammy leather of the same format (20 cm × 20 cm) are reported in Table III.

TABLE III

COMPARISON OF WIPING SPONGE CLOTH
WITH SHAMMY LEATHER

|  | Wiping sponge cloth | Shammy leather (format: 20 × 20) |
|---|---|---|
| Water absorption capacity (g) | 100–120 | 55–75 |
| Water absorption capacity (%) |  |  |
| Water absorption capacity (a) | 850–1000 | 500–600 |
| Absorption rate (sec) Standard EDANA 10-1-72A | 1 to 4 | 1020 to 1140 (17 to 19 min) |

(a) relative to the weight of the dry product

EXAMPLE 2

Cellulosic Wiping Sponge

The chosen cellulosic substrate had a weight of 740 g/m², a thickness of 23 mm, a mean porosity of 10 to 5000 μm and a water content of 200%.

The expanded aqueous latex composition was coated under the following conditions:
 foam density: 340–370 g/l;
 coating pressure: 0 to 200 N/m²;
 deposit 130–140 g/m² by dry weight.

The heat treatment of the coated product consisted of 40 seconds at between 45° C. and 60° C. under infrared panels, followed by a heat treatment in hot air for 1 minute at 100° C. and then for 6 minutes at 130° C.

The performance characteristics of the product, reduced to a thickness of 3 mm for the tests, are reported in Table IV together with those of the initial cellulosic substrate.

TABLE IV

WIPING SPONGE
Mean porosity: 10 to 5000 μm. The sample, with a format of 11 cm × 7 cm and a thickness of 2.3 cm, was reduced to a thickness of 0.3 cm for all the tests.

|  | Cellulosic substrate (thickness: 3 mm) | Wiping sponge (thickness: 3 mm) |
|---|---|---|
| Rupture stress (N) Standard EDANA 20-1-73 | 11–17 | 30–37 |
| Tear strength (N) Standard EDANA 70-1-75 | 12–22 | 12–22 |
| Weight loss due to wear (mg) Hoboken abrasion tester |  |  |
| coated side | / | 2–8 |
| sponge side | 20–30 | 20–30 |
| Water absorption capacity (g) | 17–20 | 16–21 |
| Water absorption capacity (%) |  |  |

TABLE IV-continued

WIPING SPONGE
Mean porosity: 10 to 5000 μm. The sample, with a format of 11 cm × 7 cm and a thickness of 2.3 cm, was reduced to a thickness of 0.3 cm for all the tests.

|  | Cellulosic substrate (thickness: 3 mm) | Wiping sponge (thickness: 3 mm) |
|---|---|---|
| Water absorption capacity (a) | 1800–2500 | 1700–2200 |

(a) relative to the weight of the dry product

The comparative water absorption performance characteristics of the wiping sponge and a shammy leather of the same format (11 cm × 7 cm) are reported in Table V.

TABLE V

COMPARISON OF WIPING SPONGE
WITH SHAMMY LEATHER

|  | Wiping sponge (format: 11 × 7 × 2.3) | Shammy leather (format: 11 × 7) |
|---|---|---|
| Water absorption capacity (g) | 160–170 | 5–15 |
| Water absorption capacity (%) |  |  |
| Water absorption capacity (a) | 1700–2200 | 500–600 |
| Absorption rate (sec) Standard EDANA 10-1-72A | 1 to 4 | 1020 to 1140 (17 to 19 min) |

(a) relative to the weight of the dry product

What is claimed is:

1. A cellular cellulosic wiping material, comprising a cellular cellulosic substrate at least one side of which is coated with an expanded latex foam obtained from an aqueous latex composition having a viscosity of 2500 to 3500 mPa.s measured at 20° C. under 65% relative humidity, and having a foam density of 250 to 400 g/l.

2. The material according to claim 1, wherein the viscosity of the aqueous latex is 3100 to 3300 mPa.s.

3. The material according to claim 1, wherein the foam density is 340 to 370 g/l.

4. The material according to claim 1, wherein the aqueoua latex composition comprises:
 at least 50% by weight of a flexible latex containing self-crosslinking reactive groups;
 0.05 to 0.15% by weight of a foaming agent;
 up to 5% by weight of a coagulant; and
 2 to 20% by weight of a thickener.

5. The material according to claim 4, wherein the flexible latex comprises a compound selected from the group consisting of butadiene/styrene latexes and nitrile latexes.

6. The material according to claim 4, wherein the foaming agent comprises a compound selected from the group consisting of sulfosuccinamates, alkali metal salts of fatty acids and alkylsulfonates.

7. The material according to claim 4, wherein the coagulant comprises a functional polyorganosiloxane.

8. The material according to claim 4, wherein the thickener comprises a dispersion of an acrylic polymer.

9. A process for the preparation of a cellular cellulosic wiping material, which comprises:
 forming an aqueous latex composition having a viscosity of 2500 to 3500 mPa.s;
 expanding the composition to yield a foam having a density of 250 to 400 g/l and a mean porosity of 50 to 500 μm;

coating a cellulosic substrate with the foam, the substrate having a water content of 50 to 300%; and heating the coated substrate to fix and crosslink the foam on the substrate.

10. The process according to claim 9, wherein the aqueous latex composition has a viscosity of 3100 to 3300 mPa.s.

11. The process according to claim 9, wherein the foam has a density of 340 to 370 g/l.

12. The process according to claim 9, wherein the coating takes place at a pressure of up to 750 N/m².

13. The process according to claim 9, wherein the coating takes place at a pressure of up to 200 N/m².

14. The process according to claim 9, wherein the substrate has a porosity of 10 to 5000 μm.

15. The process according to claim 9, wherein the substrate contains up to 3% by weight of a durfactant of the quaternary ammonium type.

16. The process according to claim 9, wherein the heating further comprises:

a thermal flash under infrared at 40° to 80° C. for 20 to 40 seconds; and heating in hot air at 100° to 130° C. for 2 to 10 minutes.

* * * * *